Patented Oct. 6, 1953

2,654,763

UNITED STATES PATENT OFFICE 2,654,763

PREPARATION OF DIALKYL GLYCOLURILS

Homer B. Adkins, Madison, Wis., assignor to the United States of America as represented by the Secretary of the Navy No Drawing. Application April 17, 1943,
Serial No. 483,499

3 Claims. (Cl. 260—309.7)

The present invention is concerned with the production of 1,2-diketones and certain uril and halouril derivatives thereof.

It is well known that the nitrosation of ketones of the type R—CO—CH$_2$—R with ethyl nitrite produces 1,2-diketone monoximes,

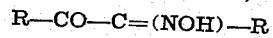

which may be hydrolyzed in dilute acid to the corresponding diketone, R—CO—CO—R. It is also known that 1,2-diketones readily condense with urea to produce glycolurils (I) which may be converted to the tetrachloroglycolurils (II) by chlorination with hypochlorous acid.

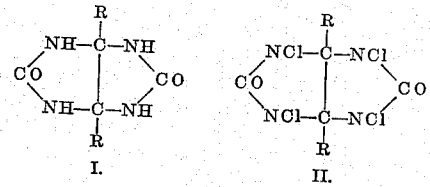

Among the known processes of producing glycoluril from the reaction of monoxime with urea is the process for preparing dimethyl glycoluril by adding concentrated sulfuric acid to a solution of diacetyl monoxime and urea in alcohol, disclosed in Berichte, vol. 41, pages 1882-4, and cited in Beilstein, Vierte Auflage, Organische Chemie, vol. XXVI, page 445.

The present invention is related to the foregoing series of reactions and is based on the discovery that glycolurils (I) may be obtained directly from the reaction mixture resulting from the nitrosation of ketones of the type RCO—CH$_2$—R. Thus, in accordance with the present invention, glycolurils are prepared from ketones of the type indicated, merely by treating the nitrosation reaction mixture directly with urea under uril-forming conditions, the process offering the distinct advantage that no intermediate preparative or purification steps are necessary.

By the process of the present invention, starting with methyl ethyl ketone, for example, it is possible to obtain dimethylglycoluril in a pure state to the extent of 46% of the theoretical, calculated on the basis of the methyl ethyl ketone employed. The resulting uril may then be subjected to chlorination to produce the tetrachlorodimethylglycoluril, in which case an over-all yield of 90 to 100 grams of the chlorinated compound may be produced from 100 grams of methyl ethyl ketone.

In order more clearly to disclose the nature of the present invention, two specific embodiments will hereinafter be described in considerable detail. In one of these examples, an acid alcoholic solution of ethyl nitrite is employed as the nitrosation medium, whereas in the other example, aqueous sodium nitrite is added to the ketone dissolved in dilute acid. Although the yields obtained by these two processes are approximately the same, in commercial operation the latter method is of course more attractive for economic reasons. It should be clearly understood, however, that the examples given below are purely illustrative and are not to be construed as a limitation upon the spirit and scope of the invention as defined in the appended claims.

EXAMPLE I (Nitrosation with ethyl nitrite)

In a 300 ml., round-bottomed, three-necked flask equipped with a reflux condenser, a thermometer, a mechanical stirrer, and a gas inlet tube extending nearly to the bottom of the flask, was placed 125 ml. (100 g., 1.38 moles) of methyl ethyl ketone and 6.5 ml. of concentrated hydrochloric acid. This solution was heated to 40-55° C. and was held at that temperature throughout the reaction by means of external cooling with ice. The nitrosation of the ketone was effected by passing in ethyl nitrite gas, generated as follows:

A solution of 100 g. (1.45 moles) of sodium nitrite in 45 ml. of 95% alcohol and enough water to make a total volume of 400 ml. was placed in a 1-liter bottle equipped with a mechanical stirrer, a gas outlet tube, and a dropping funnel, the top of which was connected by a rubber tube to an inlet tube in the stopper of the bottle, so that equal pressures were maintained in the bottle and in the funnel. A solution of 39 ml. (0.73 mole) of sulfuric acid in 45 ml. of 95% alcohol diluted to 400 ml. with water, was added to the solution in the bottle by means of the dropping funnel. The rate of adding the acid solution was adjusted so that the temperature of the ketone in the nitrosation flask was held in the desired range. About thirty minutes was required to add the sulfuric acid solution to the sodium nitrite solution. After another fifteen minutes the bubbles of ethyl nitrite ceased to appear in the nitrosation flask, and the temperature fell below 40° C. The generator was then disconnected. The volume of the nitrosation solution was usually 206-210 ml. If the temperature was not allowed to exceed 55° C., the color was yellow; otherwise it was red.

The nitrosation solution was diluted to 700 ml. with water, treated with 75 g. of urea and 10 ml. of concentrated hydrochloric acid, and allowed to stand for approximately sixty-five hours at room temperature. The precipitate was filtered off, suspended in 2 liters of water, filtered again and dried. The product was a mixture of about 62 g. of dimethylglycoluril and 34 g. of dimethylglyoxime which could be extracted with about a liter of 95% alcohol or with a solution of 35 g. of sodium hydroxide in 2 liters of water.

The dimethylglycoluril may be chlorinated as follows: 1 mole (170 g.) of dimethylglycoluril (either crude or purified); 4.5 moles (380 g.) of sodium bicarbonate; 2 liters of tap water and 5 ml. of 10% aqueous wetting agent (e. g., the dioctyl ester of sodium sulfosuccinate sold under the trade name of "Aerosol OT") was placed in a three-liter round-bottomed flask fitted with a stirrer. The mixture was heated to 40° C. and chlorine gas was passed through a gas feed stirrer and into the mixture at the rate of 80 g. of chlorine per hour. The temperature of the mixture gradually rose to about 46–47° C. in 4 hours and chlorine became visible in the atmosphere above the liquid in the flask at the end of this period. After 4 hours, the chlorine feed was reduced to 30 g. per hour after which the flow of chlorine was continued until 150 g. of chlorine had been added. The mixture was then filtered and the solid was washed with 1 liter of tap water. The product was dried in the air for 15 to 20 hours. The dried material weighed approximately 280 to 290 g. and consisted of relatively pure tetrachlorodimethylglycoluril.

EXAMPLE II

*(Nitrosation with nitrous acid)*

In a one liter, three-necked, round-bottomed flask, equipped with a reflux condenser, a mechanical stirrer, and a dropping funnel, the stem of which extended well down into the flask, was placed 125 ml. (100 g., 1.38 moles) of methyl ethyl ketone, 300 ml. of water, and 105 ml. of concentrated hydrochloric acid (sp. gr. 1.18–1.20). The mixture was held at a temperature of 50–55° C., while to it was slowly added a solution of 85 g. (1.203 moles) of sodium nitrite in 100 ml. of water. This operation required from forty to eighty minutes with intermittent cooling. Early in the nitrosation, the mixture took on a yellow-green color. If the rate of addition of the sodium nitrite was too rapid, the color became yellow or brown, and nitrogen dioxide was evolved from the condenser. As the nitrosation proceeded the color of the reaction mixture usually became more yellow and at its completion there was a slight evolution of nitrogen dioxide. The normal yellow-green color returned when the nitrogen dioxide was no longer evolved.

After the addition of the sodium nitrite solution was completed, another 25 ml. of concentrated hydrochloric acid was added, and stirring was continued until the temperature fell below 50° C., which required fifteen to thirty minutes. Eighty-five g. (1.4 moles) of urea was dissolved in this mixture, and the solution was allowed to stand at room temperature. Dimethyl glycoluril formed very rapidly at first, but the rate decreased so that a fifteen to twenty-hour period was necessary for complete precipitation. During this time the mixture should not be stored in tightly stoppered containers, since it is usually slightly effervescent. Its color changed rather rapidly to a deep red early in the condensation period. After the condensation period, the dimethylglycoluril was filtered off, washed by suspension in 1 liter of water at 60°, cooled to room temperature, filtered with suction, and dried. The final product was usually pink in color. A yield of about 65 g., or 28 to 31% of the theoretical, was obtained.

In connection with the foregoing example, it should be mentioned that the manner in which the nitrosation step is carried out exerts an important influence on the yield. In general, it has been found that a significant improvement in yield is attained in the nitrosation of water-soluble ketones of the type

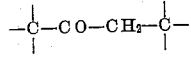

in the presence of aqueous nitrous acid, provided an alkali metal nitrite solution is added to a solution of the ketone in dilute mineral acid, such as hydrochloric acid. The addition of the ketone to aqueous nitrous acid, or the addition of the acid to the ketone dissolved in aqueous sodium nitrite, in accordance with the usual practices of the prior art, results in lower yields. Accordingly, the above characterized order of addition when nitrosating ketones in the presence of aqueous nitrous acid, constitutes a refinement in technique which offers distinct advantages.

As previously stated, the procedure described above for the conversion of methyl ethyl ketone to the corresponding glycoluril may be applied generally to ketones of the type:

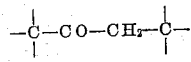

Thus for example, the process may be applied to methyl isobutyl ketone. In short, by the process of the present invention, ketones of the class described may be converted to the corresponding uril without the necessity of isolation and hydrolyzing the diketone monoxime resulting from the nitrosation reaction.

Although the process of the present invention is, of course, in no manner dependent upon any mechanism which may be postulated to explain the formation of glycolurils under the stated conditions, nevertheless a brief discussion of the possible reactions involved may be of assistance in understanding the reasons for the different purification techniques used in Examples I and II. With this purpose in view, the following comments are offered.

It appears that, in the formation of glycolurils in accordance with the present invention, a number of competitive reactions take place. Thus, in the case of methyl ethyl ketone, some of the possible reactions involved may be represented as follows:

(1) *Nitrosation*

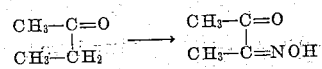

(2) *Disproportionation*

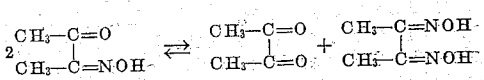

(3) *Oxime acceptance*

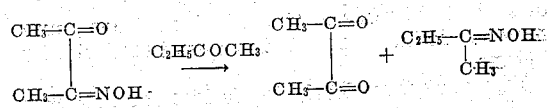

(4) Uril formation

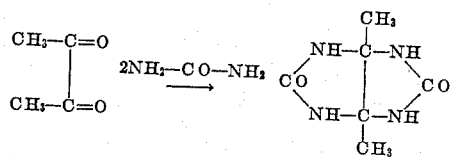

While all of the foregoing postulated reactions and equilibria (as well as others) may take place under all conditions, it appears that the nature of the nitrosation medium exerts an important influence on the rate and extent of the second and third reactions suggested above. Considering, firstly, the case where the uril is formed from the nitrosation reaction mixture obtained by the use of the aqueous nitrous acid, the course of the possible reactions depends on whether or not an excess of methyl ethyl ketone has been used in the nitrosation step. If none of the starting ketone is present during uril formation, reactions 1, 2 and 4 appear to predominate. At any rate, under these conditions, dimethylglyoxime is formed in addition to the glycoluril. If, however, an excess of methyl ethyl ketone is present in the nitrosation reaction mixture, reactions 1, 3 and 4 appear to predominate, the oxime acceptance reaction (3) apparently taking place at the expense of the disproportionation reaction (2). In this latter case (regardless of the mechanism), the reaction product contains little if any glyoxime, the oxime of methyl ethyl ketone being one of the principal by-products obtained under such conditions. Since the latter oxime is water soluble and therefore more easily removed, the presence of excess methyl ethyl ketone during uril formation offers certain advantages.

Considering now the case where uril formation occurs in the nitrosation reaction mixture obtained by the use of an alcoholic alkyl nitrite, reactions 1, 2 and 4 appear to predominate under all conditions: i. e., glyoxime and glycoluril are produced although some oxime of the starting ketone may also be formed. Thus it will be seen that the method of nitrosation determines the character of the principal non-gaseous by-products produced during uril formation. Accordingly, certain modifications in the purification techniques employed to separate the uril from the non-gaseous by-products may be required, depending on the conditions of nitrosation, even though the yield of uril in Examples I and II is substantially the same in both cases.

It will be apparent from considerations of yield of glycoluril that other reactions take place in addition to those herein suggested. It therefore should be clearly understood that the process of the invention, while perhaps more readily understandable in the light of the foregoing tentatively suggested explanation, is in no way dependent upon the correctness thereof.

It will also be apparent that many obvious variations may be made in the details given in the foregoing illustrative examples, and the invention should not be limited other than as defined by the appended claims.

I claim:

1. A method for preparing a dialkyl glycoluril which comprises nitrosating a 1.2-dialkyl ketone to the ketone oxime by adding an alkali metal nitrite to the ketone in solution in dilute aqueous strong mineral acid, the ketone being in excess, adding urea to the aqueous nitrosation reaction mixture in the presence of dilute strong mineral acid and effecting therein, hydrolysis of the ketone oxime to the diketone and condensation of the latter with the urea to the dialkyl glycoluril.

2. A method of preparing dimethyl glycoluril which comprises subjecting methyl ethyl ketone in solution in dilute aqueous strong mineral acid to nitrosation with nitrous acid to form the ketone oxime, the ketone being in excess, adding urea to the aqueous nitrosation reaction mixture in the presence of dilute strong mineral acid and the excess ketone and effecting therein, hydrolysis of the ketone oxime to dimethyl diketone and condensation of the latter with the urea to dimethyl glycoluril.

3. A method of preparing dimethyl glycoluril which comprises nitrosating methyl ethyl ketone to the ketone oxime by adding an alkali metal nitrite to the ketone in solution in dilute aqueous strong mineral acid, the ketone being in excess, adding urea to the aqueous nitrosation reaction mixture in the presence of dilute strong mineral acid and the excess ketone and effecting therein, hydrolysis of the ketone oxime to dimethyl diketone and condensation of the latter with the urea to dimethyl glycoluril.

HOMER B. ADKINS.

References Cited in the file of this patent

Berichte (1910), vol. 43 (Blitz & Behrens), pages 1992–1996 (cited in Chem. Abst. 1910, pages 2820–1).

Berichte, vol. 41, pages 1882–4, cited in Beilstein, Vierte Auflage, Organische Chemie, vol. XXVI, page 445.

Beilstein, vol. 1, page 772, citing: Annalen, vol. 283, page 244; Berichte, vol. 28, page 1518; and Berichte, vol. 38, page 696.